(12) United States Patent
Ravuri et al.

(10) Patent No.: US 12,526,506 B2
(45) Date of Patent: Jan. 13, 2026

(54) VEHICULAR VISION SYSTEM WITH UNDERBODY OBJECT DETECTION

(71) Applicant: Magna Electronics Inc., Auburn Hills, MI (US)

(72) Inventors: Naresh Ravuri, Novi, MI (US); Bijukumar Sivasankarapillai, Novi, MI (US); Sushanth Perukkanchery, Farmington Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 44 days.

(21) Appl. No.: 18/423,442

(22) Filed: Jan. 26, 2024

(65) Prior Publication Data

US 2024/0259665 A1 Aug. 1, 2024

Related U.S. Application Data

(60) Provisional application No. 63/482,086, filed on Jan. 30, 2023.

(51) Int. Cl.
*H04N 23/57* (2023.01)
*H04N 7/18* (2006.01)
*H04N 23/54* (2023.01)
*H04N 23/61* (2023.01)

(52) U.S. Cl.
CPC ............. *H04N 23/57* (2023.01); *H04N 7/183* (2013.01); *H04N 23/54* (2023.01); *H04N 23/61* (2023.01)

(58) Field of Classification Search
CPC ........ H04N 23/57; H04N 7/183; H04N 23/54; H04N 23/61; B60R 11/04
See application file for complete search history.

(56) References Cited

U.S. PATENT DOCUMENTS

| | | |
|---|---|---|
| 5,530,240 A | 6/1996 | Larson et al. |
| 5,550,677 A | 8/1996 | Schofield et al. |
| 5,670,935 A | 9/1997 | Schofield et al. |
| 5,949,331 A | 9/1999 | Schofield et al. |
| 6,087,953 A | 7/2000 | DeLine et al. |
| 6,329,925 B1 | 12/2001 | Skiver et al. |
| 6,690,268 B2 | 2/2004 | Schofield et al. |
| 6,690,413 B1 | 2/2004 | Moore |
| 7,038,577 B2 | 5/2006 | Pawlicki et al. |
| 7,308,341 B2 | 12/2007 | Schofield et al. |
| 7,338,177 B2 | 3/2008 | Lynam |

(Continued)

*Primary Examiner* — Nasim N Nirjhar
(74) *Attorney, Agent, or Firm* — HONIGMAN LLP

(57) ABSTRACT

A vehicular vision system includes a camera disposed at an underside of a vehicle. The camera is movable between (i) a deployed position, where the camera is at least partially exposed at the underside of the vehicle and views a region between the ground under the vehicle and at least a portion of the underside of the vehicle, and (ii) a stowed position, where the camera is moved from the deployed position toward the underside of the vehicle to reduce exposure of the camera. A deployment mechanism is electrically operable to move the camera between the deployed position and the stowed position. The vehicular vision system, based on processing of image data captured by the camera when in the deployed position, determines presence of an object at the region viewed by the camera and operates the deployment mechanism to move the camera to the stowed position.

21 Claims, 6 Drawing Sheets

(56) References Cited

U.S. PATENT DOCUMENTS

| | | |
|---|---|---|
| 7,370,983 B2 | 5/2008 | DeWind et al. |
| 7,446,650 B2 | 11/2008 | Scholfield et al. |
| 7,581,859 B2 | 9/2009 | Lynam |
| 7,720,580 B2 | 5/2010 | Higgins-Luthman |
| 7,855,755 B2 | 12/2010 | Weller et al. |
| 8,874,317 B2 | 10/2014 | Marczok et al. |
| 9,491,451 B2 | 11/2016 | Pliefke |
| 9,904,857 B2 | 2/2018 | Lee |
| 10,647,282 B2 | 5/2020 | Church et al. |
| 10,906,493 B2 | 2/2021 | Church et al. |
| 11,554,737 B2 | 1/2023 | Church et al. |
| 11,794,680 B2 | 10/2023 | Church et al. |
| 2013/0222573 A1 | 8/2013 | Onuma et al. |
| 2014/0169627 A1 | 6/2014 | Gupta |
| 2014/0218529 A1 | 8/2014 | Mahmoud et al. |
| 2015/0210274 A1 | 7/2015 | Clarke et al. |
| 2015/0294160 A1 | 10/2015 | Takahashi et al. |
| 2015/0344028 A1 | 12/2015 | Gieseke et al. |
| 2016/0027303 A1 | 1/2016 | Zhao et al. |
| 2016/0101734 A1 | 4/2016 | Baek |
| 2016/0119587 A1 | 4/2016 | Tan et al. |
| 2016/0253566 A1 | 9/2016 | Stein et al. |
| 2016/0297430 A1 | 10/2016 | Jones et al. |
| 2016/0325682 A1 | 11/2016 | Gupta et al. |
| 2017/0015312 A1 | 1/2017 | Latotzki |
| 2017/0017848 A1 | 1/2017 | Gupta et al. |
| 2017/0050672 A1 | 2/2017 | Gieseke et al. |
| 2017/0253237 A1 | 9/2017 | Diessner |
| 2017/0270370 A1 | 9/2017 | Utagawa et al. |
| 2017/0313332 A1 | 11/2017 | Paget et al. |
| 2017/0317748 A1 | 11/2017 | Krapf |
| 2017/0320437 A1 | 11/2017 | Liebau et al. |
| 2017/0353698 A1 | 12/2017 | Bai et al. |
| 2017/0372147 A1 | 12/2017 | Stervik et al. |
| 2018/0050636 A1 | 2/2018 | Espig |
| 2018/0079322 A1 | 3/2018 | Tanriover et al. |
| 2018/0309918 A1* | 10/2018 | Ghannam ............... H04N 7/188 |
| 2018/0321142 A1 | 11/2018 | Seifert |
| 2018/0361998 A1* | 12/2018 | Renaud ................ H04N 23/811 |
| 2019/0106163 A1* | 4/2019 | Fahland ................ B62D 37/02 |
| 2019/0135216 A1* | 5/2019 | Church .................. G08G 1/165 |
| 2019/0265038 A1 | 8/2019 | Ashbrook |
| 2021/0237594 A1* | 8/2021 | Prasad .................. B60L 53/126 |

\* cited by examiner

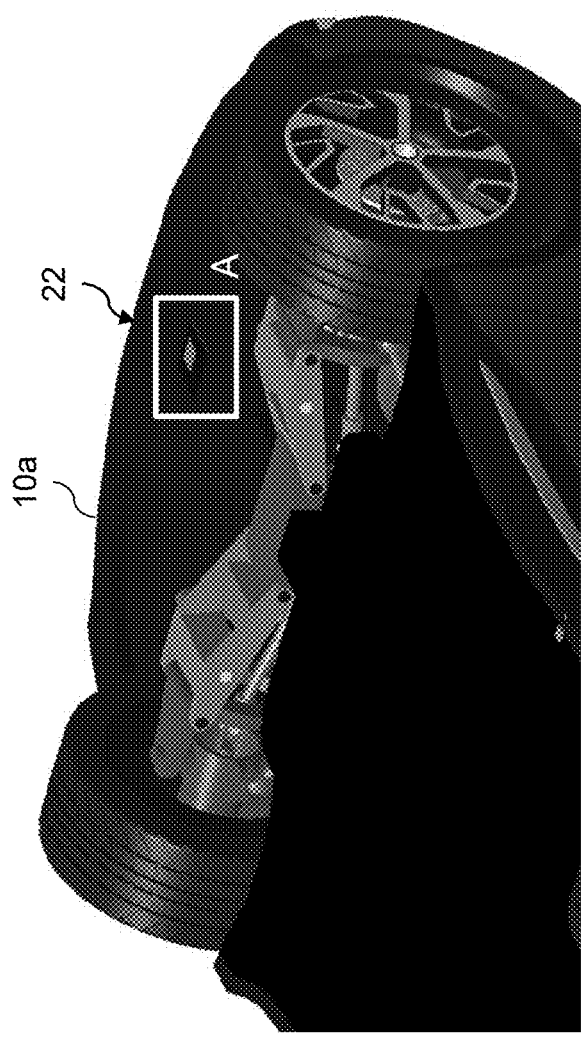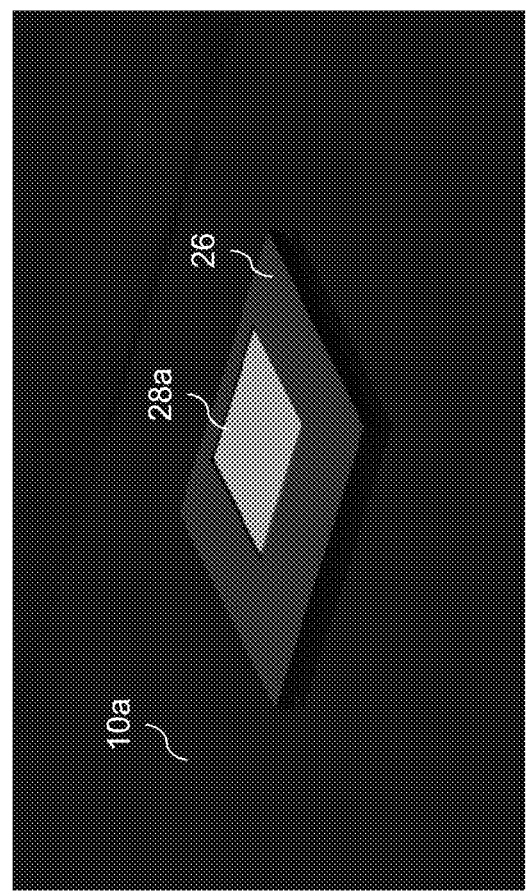
FIG. 5
FIG. 5A

VEHICULAR VISION SYSTEM WITH UNDERBODY OBJECT DETECTION

CROSS REFERENCE TO RELATED APPLICATION

The present application claims the filing benefits of U.S. provisional application Ser. No. 63/482,086 filed Jan. 30, 2023, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular vision system includes an underbody camera disposed at an underside of a body of a vehicle equipped with the vehicular vision system. The underbody camera includes an imaging array sensor having at least one million photosensors arranged in rows and columns. The underbody camera is movable between (i) a use position, where the underbody camera is at least partially extended from the underside of the body of the vehicle and views a ground surface under the body of the vehicle and being traveled on by the vehicle, and (ii) a non-use position, where the underbody camera is moved from the use position toward the underside of the body of the vehicle. A deployment mechanism is coupled to the underbody camera, and the deployment mechanism is electrically operable to move the underbody camera between the use position and the non-use position. The underbody camera views at least a region that is between the ground surface under the body of the vehicle and the underside of the body of the vehicle when the underbody camera is in the use position. The underbody camera captures image data when the underbody camera is in the use position. An electronic control unit (ECU) is disposed at the vehicle and includes electronic circuitry and associated software. The ECU includes an image processor for processing image data captured by the underbody camera. Image data captured by the underbody camera is transferred to and processed at the ECU. The vehicular vision system, via processing at the ECU of image data captured by the underbody camera, determines presence of an object at the region viewed by the underbody camera. The vehicular vision system, responsive to a condition, controls operation of the deployment mechanism to move the underbody camera from the use position to the non-use position. For example, the vehicular vision system may move the underbody camera from the use position to the non-use position in response to determination that the vehicle is travelling above a threshold speed, in response to determination that ground clearance between the ground surface and the underside of the body of the vehicle is below a threshold clearance distance, in response to determination that clearance between an object and the underside of the body of the vehicle or the camera is below a threshold clearance distance, and the like. When the camera is in the non-use position, the camera is protected from moisture and debris, such as rocks, snow, ice, and the like.

These and other objects, advantages, purposes and features of the present invention will become apparent upon review of the following specification in conjunction with the drawings.

BRIEF DESCRIPTION OF THE DRAWINGS

FIG. 5 is a perspective view of the underside of the vehicle, showing the underbody camera in a recessed or non-use position;

FIG. 5A is an enlarged view of the area A in FIG. 5; and

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
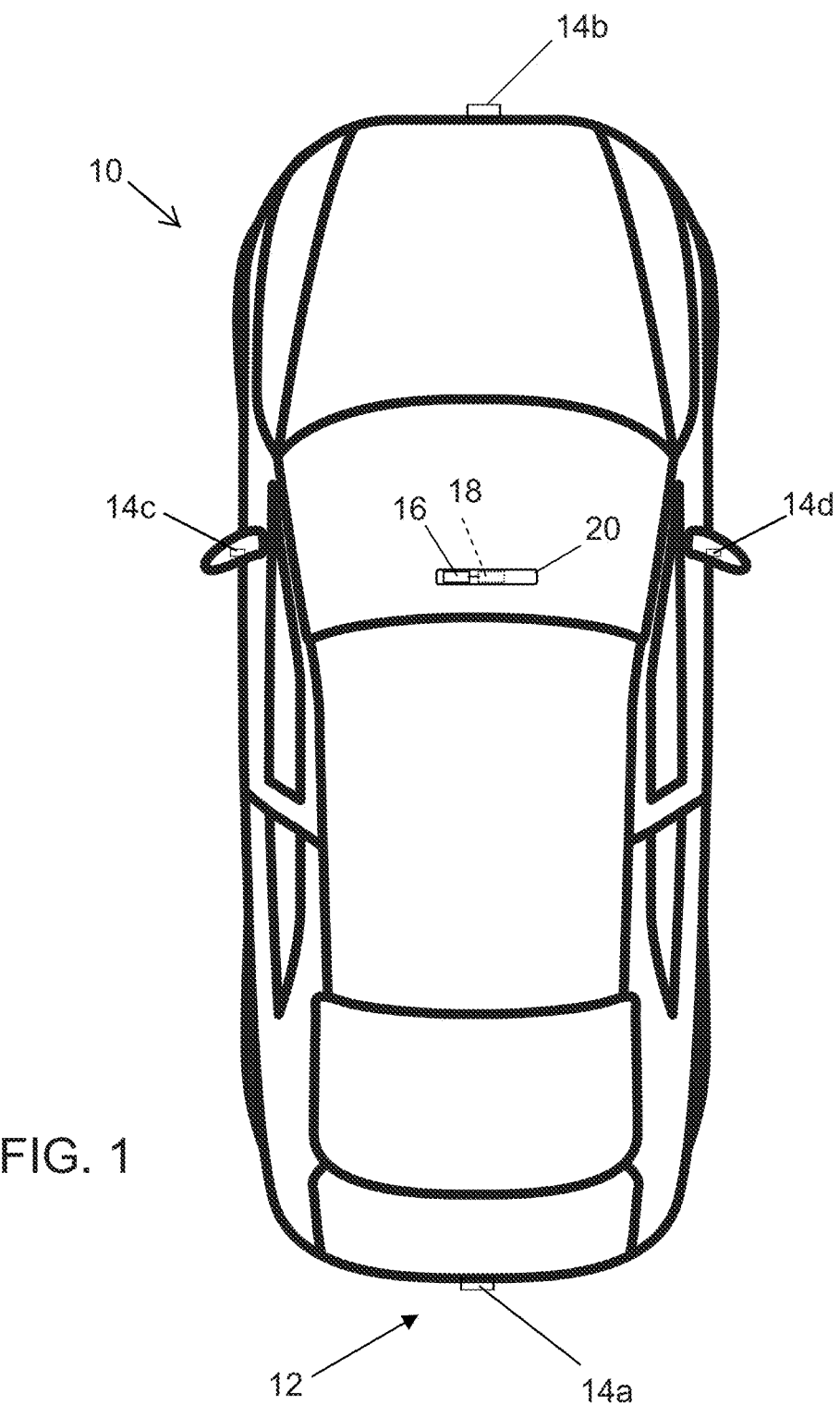
FIG. 1 is a plan view of a vehicle with a vision system that incorporates cameras.
Figure 2:
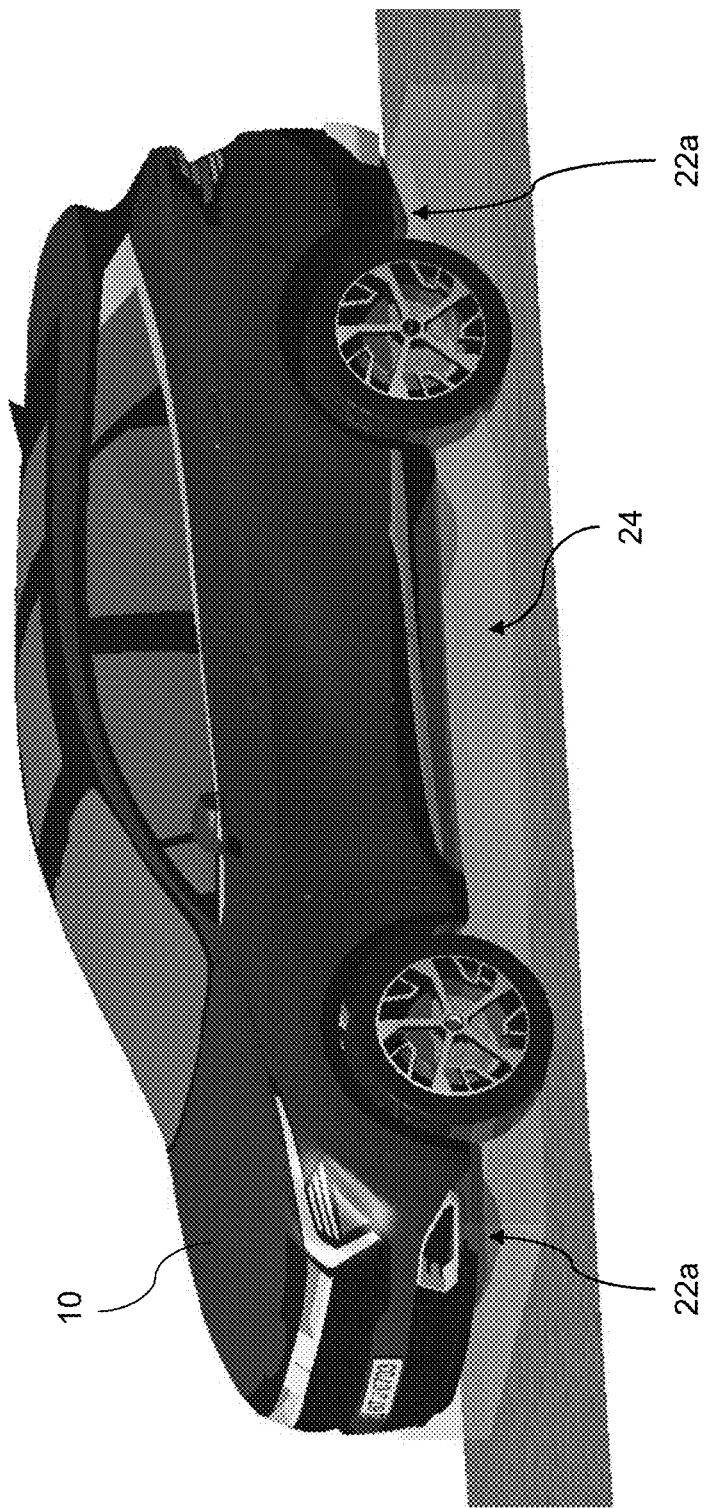
FIG. 2 is a perspective view of the vehicle, showing the fields of view of underbody cameras disposed at an underside of the vehicle.
Figure 3:
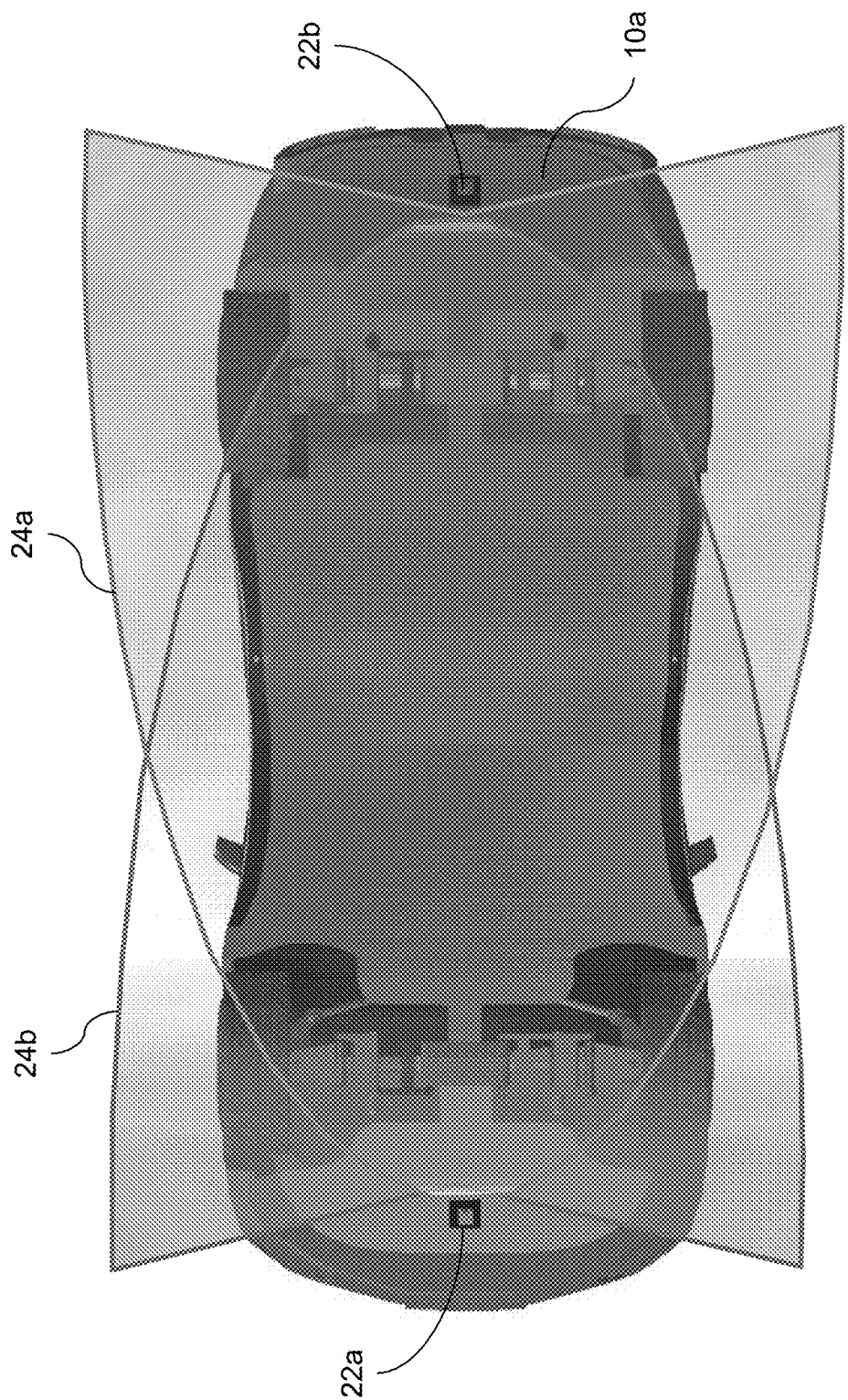
FIG. 3 is a plan view of the underside of the vehicle.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

As discussed further below, the vision system includes one or more underbody or undercarriage cameras with respective fields of view underneath the vehicle and at or along a road surface of the road along which the vehicle is travelling. Image data captured by the underbody cameras may be processed for object detection, and/or for display to a driver of the vehicle, and/or as an input for an advanced driver assistance system (ADAS) at least partially controlling maneuvering of the vehicle as the vehicle travels along the road.

As shown in FIGS. 2-7, the one or more underbody or undercarriage cameras 22 respectively view one or more regions or areas underneath the vehicle. For example, the vehicle 10 includes a first or front underbody camera 22a that is mounted at a front or forward region of the vehicle 10 and that views at least rearward and along an undersurface 10a of the vehicle between the undersurface 10a and a road surface. A second or rear underbody camera 22b is mounted at a rear or rearward region of the vehicle 10 and views at least forward and along the undersurface 10a of the vehicle between the undersurface 10a and the road surface.

The front underbody camera 22a may be positioned between a front bumper or fascia of the vehicle 10 and a front axle of the vehicle and may have a field of view 24a that includes an area between the undersurface 10a of the vehicle 10 and the road surface that extends rearward from the front axle or front tires of the vehicle 10. Thus, the front underbody camera 22a may view at least a portion of the front axle and the front tires of the vehicle (e.g., at least inner edges of the front tires), a portion of the rear axle and the rear tires of the vehicle (e.g., at least inner edges of the rear tires and optionally outer edges of the rear tires), a portion of the undersurface 10a of the vehicle rearward of the front axle, the road surface, and an area between the road surface and the undersurface 10a of the vehicle. The rear underbody camera 22b may be positioned between a rear bumper or fascia of the vehicle 10 and a rear axle of the vehicle and may have a field of view 24b that includes an area between the undersurface 10a of the vehicle 10 and the road surface that extends forward from the rear axle or rear tires of the vehicle 10. The rear underbody camera 22b may view at least a portion of the rear axle and the rear tires of the vehicle (e.g., at least inner edges of the rear tires), a portion of the front axle and the front tires of the vehicle (e.g., at least inner edges of the front tires and optionally outer edges of the front tires), a portion of the undersurface 10a of the vehicle forward of the rear axle, the road surface, and an area between the road surface and the undersurface 10a of the vehicle.

The vision system 12 may include underbody cameras 22 mounted at any suitable position of the vehicle 10 for viewing the areas underneath the vehicle 10. For example, one or more underbody cameras 22 may be mounted at the respective side regions of the vehicle and view at least partially sideward and along the undersurface 10a of the vehicle 10 between the undersurface 10a and the road surface. Furthermore, one or more underbody cameras 22 may be mounted at the forward region of the vehicle 10 and view at least forward in front of the vehicle, and one or more underbody cameras 22 may be mounted at the rearward region of the vehicle 10 and view at least rearward behind the vehicle. The vision system and underbody cameras may utilize characteristics of the vision systems and cameras described in U.S. Pat. No. 10,647,282, which is hereby incorporated herein by reference in its entirety.

Thus, the vision system integrates cameras under the body of the vehicle.

Cameras are mounted at the front and rear sides of the vehicle underbody, such as between the front fascia and the front axle, and between the rear fascia and the rear axle. Because the underbody cameras have a wide field of view (e.g., 90 degrees or greater, 110 degrees or greater, 160 degrees or greater, 180 degrees or greater, and the like), these mounting positions will provide a substantially 360 degree view of the vehicle underbody. Each underbody camera 22 may be mounted or attached at the vehicle 10 in any suitable manner. For example, the underbody camera 22 may be attached at or recessed from the undersurface 10a of the vehicle 10, or the underbody camera 22 may be mounted at a portion of the vehicle frame or other suitable structural member underneath the vehicle body.

Figure 6:
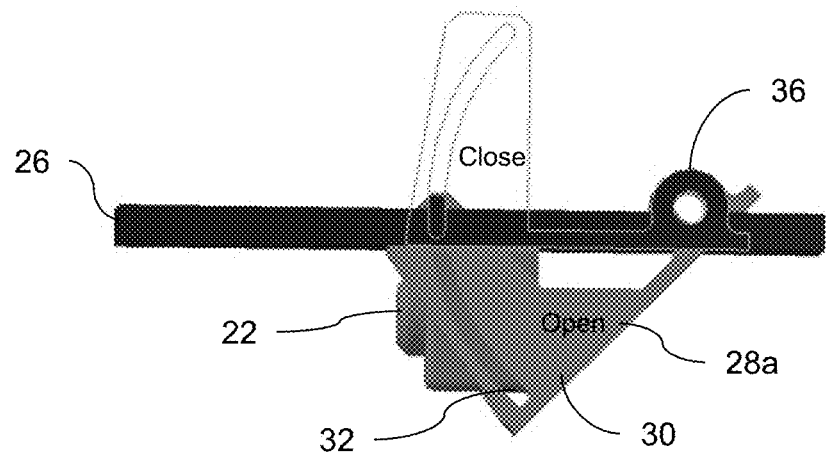
FIGS. 6 and 7 are views of the underbody camera in the extended position.
Figure 7:
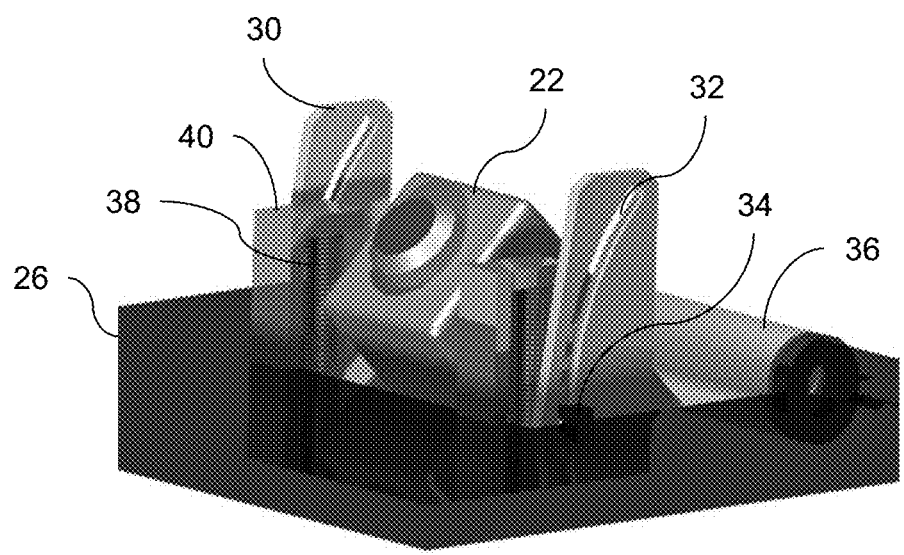

As shown in FIGS. 4-7, each underbody camera 22 is movable between an extended or use or opened or deployed position (FIGS. 4, and 4A) and a recessed or non-use or closed or stowed position (FIGS. 5-7). When in the use position, the underbody camera 22 is exposed at the exterior of the vehicle and captures image data representative of the respective field of view underneath the vehicle. When in the non-use position, the underbody camera 22 is at least partially covered or retracted at the undersurface 10a of the vehicle (such as retracted to be in a recessed portion of the underbody or carriage of the vehicle) to protect the camera when the camera is not in use and is not capturing image data.

For example, the underbody camera 22 is disposed at a mounting bracket or base portion 26 that is configured for mounting at the undersurface 10a of the vehicle 10. Optionally, the mounting bracket 26 may be mounted at a vehicle frame member or other suitable mounting location at the vehicle or integrally formed with a structural member of the vehicle. The underbody camera 22 is pivotably mounted at the mounting bracket 26 and is movable relative to the mounting bracket 26 between the recessed position and the extended position. For example, an actuator or deployment mechanism may be coupled to the underbody camera 22 and mounting bracket 26 and operable to move the camera between the recessed position and the extended position.

A cover panel 28 may be pivotably mounted at the mounting bracket 26 and the underbody camera 22 may be coupled to the cover panel 28 and movable with the cover panel 28 relative to the mounting bracket 26 between the recessed position and the extended position. The cover panel 28 includes a first or outer surface or side 28a and a second or inner surface or side opposite the outer surface, with the underbody camera 22 coupled to the inner surface of the cover panel 28. When the underbody camera 22 is in the recessed position, the outer surface 28a of the cover panel 28 is exposed at the undersurface 10a of the vehicle and may be substantially flush with the undersurface 10a and/or mounting bracket 26 to cover and protect the underbody camera 22 (e.g., FIG. 5A), such as from rocks and other debris as the vehicle travels along the road.

Figure 4:
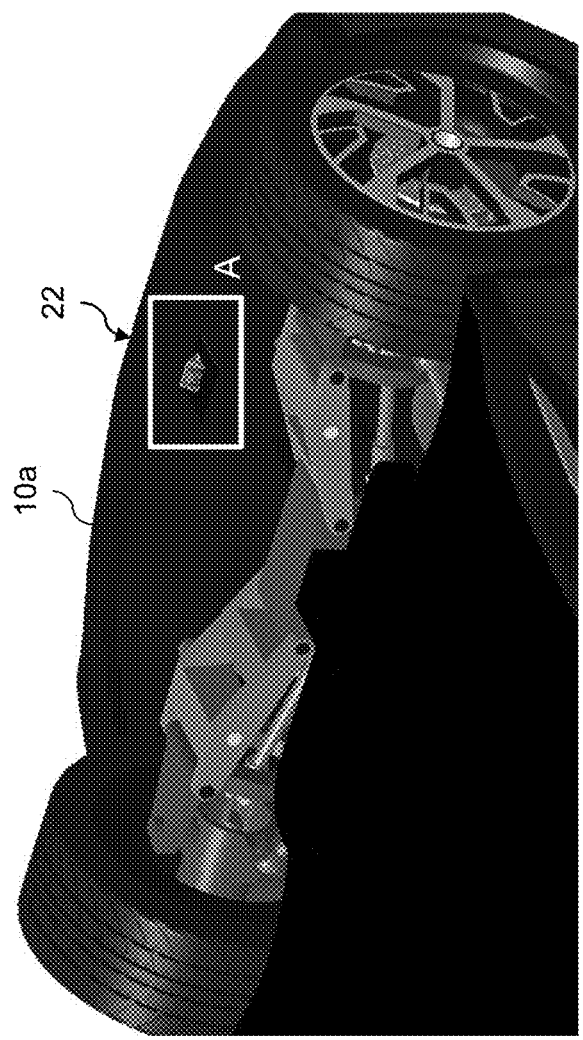
FIG. 4 is a perspective view of the underside of the vehicle, showing the underbody camera in an extended or use position.
Figure 4A:
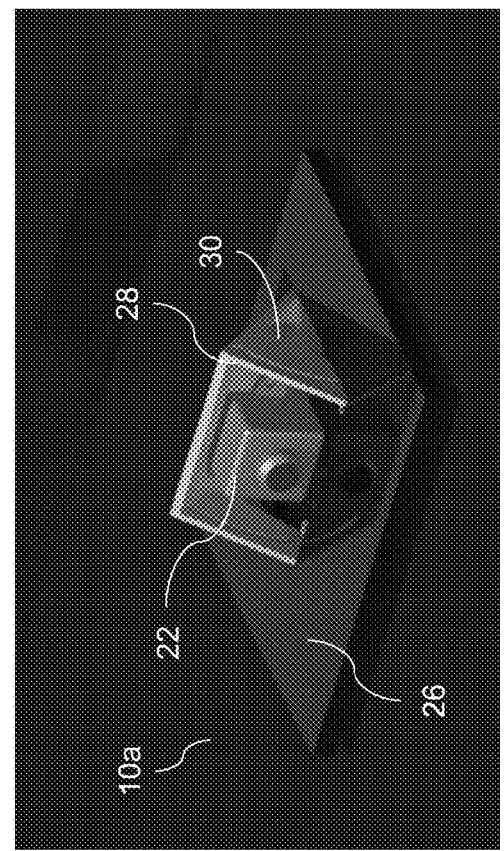
FIG. 4A is an enlarged view of the area A in FIG. 4.

Opposing sidewalls or flanges 30 may extend from the inner surface of the cover panel 28 (such as substantially perpendicular to the inner surface of the cover panel) and along opposing sides of the underbody camera 22. Thus, and as shown in FIGS. 4A, 6, and 7, when the underbody camera 22 is moved to the extended position, the cover panel 28 pivots relative to the mounting bracket 26 so that the cover panel 28 is disposed behind the camera 22 (i.e., opposite the viewing direction of the camera), along opposing sides of the camera 22, and optionally at least partially over or along a lower portion of the camera (i.e., between the camera and the road surface) to protect the camera while allowing the camera to view underneath the vehicle.

Guide rails or slots 32, such as arcuate slots, may be formed along the flanges 30 and respective pins or pegs 34 may extend from the mounting bracket 26 and be received in the respective slots 32 for guiding movement of the cover panel 28 and underbody camera 22 between the recessed position and the extended position. That is, as the underbody camera 22 moves between the recessed position and the extended position, the pegs 34 extending from the mounting bracket 26 are received in and travel along respective guide rails 32 formed along the flanges 30. The guide rails 32 may be configured so that, when the cover panel 28 is pivoted and the pegs 34 engage an end of the guide rails 32, the underbody camera 22 is in a known and repeatable extended position, which may improve image data processing, such as for object detection and calibration of the camera.

The cover panel 28 and underbody camera 22 may be pivotable relative to the mounting bracket 26 via a shape memory alloy (SMA) spring actuator where one or more SMA springs 36, such as a SMA compression spring, are coupled to the mounting bracket 26 and the cover panel 28 and operable between a non-energized state and an energized state. When in the non-energized state, the SMA spring 36 is deformable relative to the cover panel 28 and mounting bracket 26 and the cover panel 28 and underbody camera 22 are biased toward the recessed position via a biasing element 38, such as a torsion spring, coupled to the cover panel 28 and the mounting bracket 26. That is, when the SMA actuator is in the non-energized state, the biasing force of the torsion spring 38 overcomes a biasing force of the SMA spring 36 to move the underbody camera 22 and cover panel 28 to the recessed position. When in the energized state, an electric current is applied to the SMA spring 36 and the SMA spring 36 expands or decompresses and applies a biasing force between the cover panel 28 and mounting bracket 26 to move the cover panel 28 and underbody camera 22 to the extended position. Thus, when the SMA actuator is in the energized state, the biasing force of the SMA spring 36 overcomes the biasing force of the torsion spring 38 to move the underbody camera 22 and cover panel 28 to the extended position.

The SMA spring 36 may comprise any suitable shape memory alloy, such as a titanium-nickel or austenite alloy, that is deformable when not energized and that, when an electric current is applied to the spring, returns or transforms to a memory shape. Thus, when the cover panel 28 and underbody camera 22 are in the recessed position, the SMA spring 36 is compressed, such as between a portion of the cover panel 28 and an actuator cylinder or case 40, by the biasing force of the torsion spring 38. To move the cover panel 28 and underbody camera 22 to the extended position, the SMA spring 36 is energized to return to its memory shape and expands between the portion of the cover panel 28 and the actuator cylinder 40 against the biasing force of the torsion spring 38.

Thus, in the cold, un-energized state, the shape memory alloy (SMA) spring can easily be deformed by yielding to the forces acting on it. In the energized state, the shape memory alloy unfolds its full force. In this phase, the material remembers an external shape exactly. The torsion spring helps to close the camera inside the bracket once the SMA spring is non-energized to keep the camera in the closed position.

The vision system 12 may selectably energize the SMA spring 38 to move the underbody camera 22 between the recessed position and the extended position. When the underbody camera 22 is in the extended position, the vision system 12 processes image data captured via the underbody camera 22. For example, the underbody camera 22 may be in the use position for capturing image data when the vehicle is performing a parking maneuver, when the vehicle travelling at a speed that is lower than a threshold speed (e.g., 10 miles per hour or less, 15 miles per hour or less, 25 miles per hour or less, 55 miles per hour or less, and the like), upon vehicle startup, when the vehicle is in a stationary position, and the like. The underbody camera 22 may be moved into the recessed position to protect the camera (such as from rocks and other debris), such as when the vehicle ceases performing the parking maneuver, when the vehicle is travelling at a speed that is greater than the threshold speed, when the vehicle is turned off, and the like.

The system may move the camera between the extended position and the retracted position based on any suitable vehicle condition or input. For example, the camera may be moved from the retracted position to the extended position based on a user input at the interior cabin of the vehicle, such as an input requesting display of video images generated based on the image data captured by the underbody cameras, or an input adjusting a drive mode of the vehicle (e.g., the underbody cameras may be moved to the extended position when the vehicle is in an off-road driving mode). The camera may be moved from the retracted position to the extended position based on a determined road condition, such as a determination that the vehicle is travelling on a dirt or uneven road surface.

Image data captured by the underbody camera 22 may be processed by the vision system 12 to generate video images for display to the driver of the vehicle 10. The system 12 may operate to display the under-vehicle images responsive to a trigger or user input or the like. For example, a driver may actuate a user input so the display displays images derived from image data captured by the underbody camera(s) 22, such as while driving over rough terrain or the like. Optionally, the system 12 may automatically display images derived from image data captured by the underbody camera(s) 22 responsive to detection of an object (such as an object greater than a threshold size or height), such as rocks or rough terrain or the like (such as via processing of image data captured by one or more underbody cameras). For example, if the system 12 detects a large object (greater than a threshold height or size, such as an object having a height of greater than, for example, 4 inches or 8 inches or 12 inches, depending on the particular application of the system, and optionally depending on the ground clearance for that vehicle) and/or detects rough terrain that is at a threshold level of roughness or variations (such as changes in height of the terrain that are greater than a threshold height over a predetermined distance, such as a change in height of, for example, a six inch rise or fall in height over a six inch distance or 10 inch rise or fall in height over a 12 inch distance or the like), the system 12 may automatically display images so the driver of the vehicle 10 is aware of the detected object/terrain and can react or adjust driving accordingly. Optionally, responsive to detection of a sufficiently large object or sufficiently large change in terrain, the control may control the vehicle 10 (such as steering and/or braking of the vehicle) to avoid or mitigate impact with the detected object or terrain change.

Because the underbody cameras 22 may view the road surface or ground and at least a portion of the undersurface 10a of the vehicle, the system may determine whether a detected object is likely to contact a portion of the undersurface 10a of the vehicle (and/or an axle of the vehicle, a tire of the vehicle, a bumper of the vehicle, and the like) as the vehicle continues along its path of travel. If the system determines that the object is likely to contact the vehicle, the system may generate an alert to the driver of the vehicle (which may include displaying video images generated from the captured image data) and/or control the braking system of the vehicle to stop the vehicle.

Further, based on determination that a detected object is within a threshold distance from the underside of the vehicle and/or the camera, the system may move the camera from the extended position to the retracted position. That is, based on determination that the detected object may contact the camera in the extended position, the system may move the camera to the retracted position to avoid contact between the object and camera.

Optionally, the display device 16 may display video images derived from image data captured by one or more underbody cameras 22, such as responsive to actuation of a user input in the vehicle 10, so that the driver of the vehicle, as the vehicle 10 is approaching an object or rough terrain, can actuate the display device 16 to view the object(s) from underneath the vehicle 10 to see if the objects/terrain are below the ground clearance of the vehicle 10. The control may generate an alert responsive to determination that an object or terrain may impact the underside of the vehicle 10 (i.e., has a height greater than the ground clearance of the vehicle). The alert may comprise an audible or visual alert, and may comprise an electronically generated graphic overlay at the displayed images, such as a graphic overlay that highlights the detected object (such as by coloring it red or flashing the displayed image or otherwise demarcating the object or displayed images to draw the driver's attention to a potential hazard).

When the underbody camera 22 is in the extended position and viewing the area underneath the vehicle 10, image data captured by the camera may be processed by the vision system 12 and used for object detection. For example, the vision system 12 may process the captured image data to detect objects, animals, humans, and the like that may be underneath the vehicle and/or near the wheels of the vehicle (and thus in blind spots of the driver and/or other cameras of the vision system).

Image data captured by the underbody cameras 22 may be processed by the vision system 12 as an input for an ADAS of the vehicle that at least partially controls operation of the vehicle as the vehicle travels along the road. For example, the ADAS may provide at least semi-autonomous or autonomous control of the vehicle and control the acceleration, steering, and/or braking of the vehicle as the vehicle travels along the road.

The vision system 12 may deploy and operate the underbody cameras 22 and process image data captured by the cameras in response to a vehicle condition, such as upon vehicle startup or when the vehicle is travelling over uneven or rough or off-road terrain. Optionally, the vision system 12 may operate the underbody cameras 22 when the vehicle is travelling below a threshold speed. The vision system 12 may operate the underbody cameras 22 when an ADAS of the vehicle is at least partially controlling operation of the vehicle. Optionally, the vision system 12 may operate the underbody cameras 22 based on image data captured by another camera at the vehicle, such as if an object is detected in the image data captured by the other camera and in proximity of the vehicle 10.

The image data captured by the underbody cameras 22 may be utilized when the ADAS performs a parking maneuver. That is, the ADAS may process the captured image data, such as to determine presence of objects underneath the vehicle, when controlling the vehicle 10 to maneuver the vehicle into and/or out of a parking spot. The system may process image data captured by the underbody cameras 22 to detect and/or determine position of a curb relative to the side of the vehicle during a parallel parking maneuver. The image data may be utilized when the ADAS performs a lane change maneuver. For example, the field of view 24 (e.g., FIGS. 2 and 3) of the cameras 22 may extend along the sides of the vehicle and the ADAS may process the captured image data to determine presence of objects (e.g., other vehicles) at or near ground level and along the side of the vehicle when performing a lane change. Image data captured by the underbody cameras 22 may be utilized to determine or detect lane markers of the lane along which the vehicle 10 is travelling.

Thus, image data captured by the underbody cameras 22 may be used for detection of objects under the vehicle. The underbody camera may be used as surveillance along with the surround view cameras. The camera helps in detecting blind spots of the underbody and/or wheels of the vehicle to detect objects, animals, humans, and the like. The camera is helpful when the vehicle is moving from a stationary position to detect objects, animals, humans, and the like, at the underbody and wheels of the vehicle. The underbody camera may be used as an input to the ADAS ECU to brake in case of objects or vulnerable road user (VRU) detection under the wheels of the vehicle.

Optionally, the system may operate in a low power mode where the camera(s) may be deactivated under certain driving conditions (such as, for example, highway driving conditions where the underbody views are not needed). Optionally, the system may utilize LED backlighting (via energizing one or more light emitting diodes or LEDs, such as visible light emitting LEDs or near infrared light emitting LEDs) and/or night vision incorporated into the one or more underbody cameras. The system may use two or more cameras for range/distance determination of objects present in the fields of views of the two or more cameras.

Optionally, the system may provide a cylindrical view display, which can be panned or adjusted using the one or more surround view cameras and/or the one or more underbody cameras. Optionally, the system may provide a spherical view display, which can be panned or adjusted using the one or more surround view cameras and/or the one or more underbody cameras. Optionally, the system may provide a panoramic view display using the one or more surround view cameras and/or the one or more underbody cameras. The view or display selection may be based on object detection and/or clearance detection (as detected via processing image data captured by one or more of the surround view cameras and/or the one or more undercarriage cameras.

The system may detect objects or ground clearance via processing of captured image data or via sensing via one or more underbody ultrasonic sensors, lidar sensors or radar sensors. Optionally, the system may also utilize a forward viewing camera mounted on top of the vehicle (such as at the top of a cab of a pickup truck or the like) for object/clearance detection ahead and above the vehicle (such as for determining clearance for the vehicle to pass through a tunnel or under a low bridge and/or the like).

Thus, the system provides a plurality of underbody or undercarriage cameras that capture image data representative of the area under the vehicle. The system may display video images derived from image data captured by the underbody cameras to assist the driver in seeing obstacles or rough terrain or the like during a driving maneuver of the vehicle. Optionally, the system may merge or stitch image data captured by one or more underbody cameras with image data captured by one or more surround view cameras to provide enhanced display of the area at and around the vehicle to assist the driver in maneuvering the vehicle, such as during a reversing or parking maneuver. Optionally, the system may process image data captured by the underbody cameras to detect obstacles or rough terrain or the like, and may generate an alert to the driver (or may control the steering and/or braking of the vehicle) so that the vehicle may avoid the detected obstacle or the like. The underbody cameras are movable between the extended or use position and the recessed or non-use position to protect the cameras when not in use and/or when the vehicle has low ground clearance to objects and terrain underneath the vehicle.

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The vision system may include a display for displaying images captured by one or more of the exterior (forward, rearward, sideward) viewing cameras and/or one or more of the undercarriage cameras for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. No. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize aspects of the parking assist systems described in U.S. Pat. No. 8,874,317 and/or U.S. Publication Nos. US-2017-0329346; US-2017-0317748; US-2017-0253237; US-2017-0050672; US-2017-0017848; US-2017-0015312 and/or US-2015-0344028, which are hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. No. 10,442,360 and/or 10,046,706, and/or U.S. Publication Nos. US-2021-0245662; US-2021-0162926; US-2021-0155167 and/or US-2019-0118717, and/or International Publication No. WO 2022/150826, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
a camera disposed at an underside of a vehicle equipped with the vehicular vision system;
wherein the camera comprises an imaging array sensor having at least one million photosensors arranged in rows and columns;
wherein the camera is movable between (i) a deployed position, where the camera is at least partially exposed at the underside of the vehicle and views a region between the ground under the vehicle and at least a portion of the underside of the vehicle, and (ii) a stowed position, where the camera is moved from the deployed position toward the underside of the vehicle to reduce exposure of the camera at the underside of the vehicle;
a deployment mechanism electrically operable to move the camera between the deployed position and the stowed position;
wherein the camera is disposed at a base portion mounted at the underside of the vehicle, and wherein the deployment mechanism is operable to move the camera relative to the base portion between the deployed position and the stowed position;
wherein a cover panel is movably mounted at the base portion, and wherein the camera is coupled to the cover panel, and wherein the cover panel moves relative to the base portion to move the camera between the deployed position and the stowed position;
wherein the deployment mechanism comprises a shape memory alloy spring (SMA spring), and wherein the SMA spring, when the deployment mechanism is electrically operated to move the camera between the deployed position and the stowed position, operates between (i) an energized state, where an electric current is applied to the SMA spring and the camera is moved to the deployed position, and (ii) a non-energized state, where the electric current is not applied to the SMA spring and the camera is moved to the stowed position;
wherein the camera captures image data when the camera is in the deployed position;
an electronic control unit (ECU);
wherein the ECU comprises electronic circuitry and associated software, and wherein the electronic circuitry of the ECU comprises an image processor operable to process image data captured by the camera;
wherein image data captured by the camera is transferred to and processed at the ECU;
wherein the vehicular vision system, based on processing at the ECU of image data captured by the camera with the camera in the deployed position, determines presence of an object at the region that is viewed by the camera when the camera is in the deployed position; and
wherein the vehicular vision system, based at least in part on the determined presence of the object at the region that is viewed by the camera when the camera is in the deployed position, electrically operates the deployment mechanism to move the camera from the deployed position toward the stowed position.

2. The vehicular vision system of claim 1, wherein the camera is pivotable relative to the base portion between the deployed position and the stowed position.

3. The vehicular vision system of claim 1, wherein, when the camera is in the stowed position, the camera is at least partially recessed into the base portion, and wherein, when the camera is in the deployed position, the camera is moved from the stowed position relative to the base portion to at least partially extend the camera from the base portion.

4. The vehicular vision system of claim 1, wherein a biasing element biases the cover panel toward the base portion to bias the camera toward the stowed position.

5. The vehicular vision system of claim 4, wherein, when the SMA spring is in the non-energized state, (i) the SMA spring is deformable relative to the base portion and the cover panel and (ii) the biasing element retains the camera in the stowed position.

6. The vehicular vision system of claim 4, wherein, when the SMA spring is in the energized state, the SMA spring (i) biases the cover panel away from the base portion to bias the camera toward the deployed position and (ii) overcomes the biasing element to move the camera toward the deployed position.

7. The vehicular vision system of claim 1, wherein an outer surface of the cover panel, when the camera is in the stowed position, is flush with a surface at the underside of the vehicle.

8. The vehicular vision system of claim 1, wherein the camera does not capture image data when the camera is in the stowed position.

9. The vehicular vision system of claim 1, wherein the vehicular vision system, based on a determination that the vehicle is travelling at a speed that is greater than a threshold speed, electrically operates the deployment mechanism to move the camera from the deployed position to the stowed position.

10. The vehicular vision system of claim 1, wherein the vehicular vision system, based on a determination that a ground clearance distance between the ground and the underside of the vehicle is less than a threshold ground clearance distance, electrically operates the deployment mechanism to move the camera from the deployed position to the stowed position.

11. The vehicular vision system of claim 10, wherein determination that the ground clearance distance between the ground and the underside of the vehicle is less than the threshold ground clearance distance is based on processing at the ECU of image data captured by the camera with the camera in the deployed position.

12. The vehicular vision system of claim 1, wherein the vehicular vision system, based on a determination that a clearance distance between the determined object and the underside of the vehicle is less than a threshold clearance distance, electrically operates the deployment mechanism to move the camera from the deployed position to the stowed position.

13. The vehicular vision system of claim 1, wherein the vehicular vision system, based on a user input, electrically operates the deployment mechanism to move the camera between the deployed position and the stowed position.

14. The vehicular vision system of claim 1, wherein the vehicular vision system, based on a determined drive mode of the vehicle, electrically operates the deployment mechanism to move the camera between the deployed position and the stowed position.

15. The vehicular vision system of claim 1, wherein the vehicle is equipped with an advanced driver assistance system (ADAS) that is operable to at least partially control operation of the vehicle, and wherein image data captured by the camera is processed for the ADAS.

16. A vehicular vision system, the vehicular vision system comprising:
a camera module disposed at an underside of a vehicle equipped with the vehicular vision system;
wherein the camera module comprises a base portion mounted at the underside of the vehicle;
wherein the camera module comprises a camera pivotably disposed at the base portion, and wherein the camera comprises an imaging array sensor having at least one million photosensors arranged in rows and columns;
wherein the camera is pivotable relative to the base portion between (i) a deployed position, where the camera is at least partially exposed at the underside of the vehicle and views a region between the ground under the vehicle and at least a portion of the underside of the vehicle, and (ii) a stowed position, where the camera is pivoted from the deployed position toward the underside of the vehicle to reduce exposure of the camera at the underside of the vehicle;
wherein, when the camera is in the stowed position, the camera is at least partially recessed into the base portion, and wherein, when the camera is in the deployed position, the camera is pivoted from the stowed position relative to the base portion to at least partially extend the camera from the base portion;
a deployment mechanism electrically operable to pivot the camera relative to the base portion between the deployed position and the stowed position;
wherein the camera module comprises a cover panel pivotably mounted at the base portion, and wherein the camera is coupled to the cover panel, and wherein the cover panel pivots relative to the base portion to pivot the camera between the deployed position and the stowed position;
wherein the deployment mechanism comprises a shape memory alloy spring (SMA spring), and wherein the SMA spring, when the deployment mechanism is electrically operated to move the camera between the deployed position and the stowed position, operates between (i) an energized state, where an electric current is applied to the SMA spring and the camera is moved to the deployed position, and (ii) a non-energized state, where the electric current is not applied to the SMA spring and the camera is moved to the stowed position;
wherein the camera captures image data when the camera is in the deployed position;
an electronic control unit (ECU);
wherein the ECU comprises electronic circuitry and associated software, and wherein the electronic circuitry of the ECU comprises an image processor operable to process image data captured by the camera;
wherein image data captured by the camera is transferred to and processed at the ECU;
wherein the vehicular vision system, based on processing at the ECU of image data captured by the camera with the camera in the deployed position, determines presence of an object at the region that is viewed by the camera when the camera is in the deployed position; and
wherein the vehicular vision system, based at least in part on the determined presence of the object at the region that is viewed by the camera when the camera is in the deployed position, electrically operates the deployment mechanism to pivot the camera from the deployed position toward the stowed position.

17. The vehicular vision system of claim 16, wherein the vehicular vision system, based on a determination that the vehicle is travelling at a speed that is greater than a threshold speed, electrically operates the deployment mechanism to pivot the camera from the deployed position to the stowed position.

18. The vehicular vision system of claim 16, wherein the vehicular vision system, based on a determination that a ground clearance distance between the ground and the underside of the vehicle is less than a threshold ground clearance distance, electrically operates the deployment mechanism to pivot the camera from the deployed position to the stowed position.

19. A vehicular vision system, the vehicular vision system comprising:
- a camera module disposed at an underside of a vehicle equipped with the vehicular vision system;
- wherein the camera module comprises a base portion mounted at the underside of the vehicle;
- wherein the camera module comprises a camera movably disposed at the base portion, and wherein the camera comprises an imaging array sensor having at least one million photosensors arranged in rows and columns;
- wherein the camera is movable relative to the base portion between (i) a deployed position, where the camera is at least partially exposed at the underside of the vehicle and views a region between the ground under the vehicle and at least a portion of the underside of the vehicle, and (ii) a stowed position, where the camera is moved from the deployed position toward the underside of the vehicle to reduce exposure of the camera at the underside of the vehicle;
- a deployment mechanism electrically operable to move the camera relative to the base portion between the deployed position and the stowed position;
- wherein the camera module comprises a cover panel movably mounted at the base portion, and wherein the camera is coupled to the cover panel, and wherein the cover panel moves relative to the base portion to move the camera between the deployed position and the stowed position;
- wherein the deployment mechanism comprises a shape memory alloy spring (SMA spring), and wherein the SMA spring, when the deployment mechanism is electrically operated to move the camera between the deployed position and the stowed position, operates between (i) an energized state, where an electric current is applied to the SMA spring and the camera is moved to the deployed position, and (ii) a non-energized state, where the electric current is not applied to the SMA spring and the camera is moved to the stowed position;
- wherein the vehicular vision system, based on a user input, electrically operates the deployment mechanism to move the camera between the deployed position and the stowed position;
- wherein the camera captures image data when the camera is in the deployed position, and wherein the camera does not capture image data when the camera is in the stowed position;
- an electronic control unit (ECU);
- wherein the ECU comprises electronic circuitry and associated software, and wherein the electronic circuitry of the ECU comprises an image processor operable to process image data captured by the camera;
- wherein image data captured by the camera is transferred to and processed at the ECU;
- wherein the vehicular vision system, based on processing at the ECU of image data captured by the camera with the camera in the deployed position, determines presence of an object at the region that is viewed by the camera when the camera is in the deployed position; and
- wherein the vehicular vision system, based at least in part on the determined presence of the object at the region that is viewed by the camera when the camera is in the deployed position, electrically operates the deployment mechanism to move the camera from the deployed position toward the stowed position.

20. The vehicular vision system of claim 19, wherein the vehicular vision system, based on a determined drive mode of the vehicle, electrically operates the deployment mechanism to move the camera between the deployed position and the stowed position.

21. The vehicular vision system of claim 19, wherein the vehicle is equipped with an advanced driver assistance system (ADAS) that is operable to at least partially control operation of the vehicle, and wherein image data captured by the camera is processed for the ADAS.

* * * * *